US010152949B2

(12) United States Patent
Cross et al.

(10) Patent No.: US 10,152,949 B2
(45) Date of Patent: *Dec. 11, 2018

(54) MODULAR FLEXIBLE DISPLAY SYSTEM AND METHODS

(71) Applicant: Nanolumens Acquisition, Inc., Norcross, GA (US)

(72) Inventors: Robert J. Cross, Alpharetta, GA (US); Jorge Perez-Bravo, Alpharetta, GA (US)

(73) Assignee: Nanolumens Acquisition, Inc., Norcross, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/942,928

(22) Filed: Apr. 2, 2018

(65) Prior Publication Data

US 2018/0226059 A1     Aug. 9, 2018

Related U.S. Application Data

(63) Continuation of application No. 15/822,895, filed on Nov. 27, 2017, now Pat. No. 9,934,759, which is a continuation of application No. 15/332,516, filed on Oct. 24, 2016, now Pat. No. 9,830,885.

(60) Provisional application No. 62/246,587, filed on Oct. 26, 2015.

(51) Int. Cl.
*F21S 4/00*     (2016.01)
*G09G 5/14*     (2006.01)
*G06F 3/14*     (2006.01)

(52) U.S. Cl.
CPC ............. *G09G 5/14* (2013.01); *G06F 3/1446* (2013.01); *G09G 2300/026* (2013.01); *G09G 2380/02* (2013.01)

(58) Field of Classification Search
CPC ............... G09G 5/14; G09G 2300/026; G09G 2380/02; G06F 3/1446
See application file for complete search history.

(56) References Cited

U.S. PATENT DOCUMENTS

| | | |
|---|---|---|
| 5,747,928 A | 5/1998 | Shanks et al. |
| 6,332,690 B1 | 12/2001 | Murifushi |
| 6,813,853 B1 | 11/2004 | Tucker |
| 6,819,045 B2 | 11/2004 | Okita et al. |
| 6,974,971 B2 | 12/2005 | Young |
| 7,242,398 B2 | 7/2007 | Nathan et al. |

(Continued)

*Primary Examiner* — Evan Dzierzynski
(74) *Attorney, Agent, or Firm* — Theodore Heske, III

(57) ABSTRACT

Disclosed are embodiments of flexible display modules and systems of flexible display modules. Display modules have a plurality of light emitting elements arranged in a predetermined pattern and providing a highly uniform visual effect. Alignment and complementary alignment features enable the alignment of adjacent display modules and the creation of large displays from a plurality of aligned display modules. Features to couple to and retain a support frame are provided. Flexible and durable weather resistance features are provided. Modules and systems have features that permit installation and removal from the front side or the back side of the display. A system of modular support frames works cooperatively with the display modules, adapting to different mounting environments, and thereby providing large modular displays with desirable properties.

19 Claims, 9 Drawing Sheets

(56) References Cited

U.S. PATENT DOCUMENTS

| | | |
|---|---|---|
| 7,636,085 B2 | 12/2009 | Yang |
| 7,710,370 B2 | 5/2010 | Slikkerveer et al. |
| 7,714,801 B2 | 5/2010 | Kimmel |
| 7,825,582 B2 | 11/2010 | Furukawa et al. |
| 7,834,537 B2 | 11/2010 | Kee et al. |
| 7,834,962 B2 | 11/2010 | Satake et al. |
| 7,868,545 B2 | 1/2011 | Hioki et al. |
| 7,977,170 B2 | 7/2011 | Tredwell et al. |
| 8,023,060 B2 | 9/2011 | Lin et al. |
| 8,096,068 B2 | 1/2012 | Van Rens |
| 8,097,812 B2 | 1/2012 | Wang et al. |
| 8,098,486 B2 | 1/2012 | Hsiao |
| 8,228,667 B2 | 7/2012 | Ma |
| 8,284,369 B2 | 10/2012 | Chida et al. |
| 8,319,725 B2 | 11/2012 | Okamoto et al. |
| 8,456,078 B2 | 6/2013 | Hashimoto |
| 8,471,995 B2 | 6/2013 | Tseng |
| 8,477,464 B2 | 7/2013 | Visser et al. |
| 8,493,520 B2 | 7/2013 | Gay et al. |
| 8,493,726 B2 | 7/2013 | Visser et al. |
| 8,654,519 B2 | 2/2014 | Visser |
| 8,780,039 B2 | 7/2014 | Gay et al. |
| 8,816,977 B2 | 8/2014 | Rothkopf et al. |
| 8,873,225 B2 | 10/2014 | Huitema et al. |
| 8,963,895 B2 | 2/2015 | Cope et al. |
| 8,982,545 B2 | 3/2015 | Kim et al. |
| 9,013,367 B2 | 4/2015 | Cope et al. |
| 9,058,755 B2 | 6/2015 | Cope et al. |
| 9,071,809 B2 | 6/2015 | Cope et al. |
| 9,117,384 B2 | 8/2015 | Phillips et al. |
| 9,159,707 B2 | 10/2015 | Cope |
| 9,176,535 B2 | 11/2015 | Bohn et al. |
| 9,279,573 B1 | 3/2016 | Perez-Bravo et al. |
| 9,286,812 B2 | 3/2016 | Bohn et al. |
| 9,326,620 B1 | 5/2016 | Cross et al. |
| 9,330,583 B2 | 5/2016 | Cox |
| 9,330,589 B2 | 5/2016 | Cope et al. |
| 9,335,793 B2 | 5/2016 | Rothkopf |
| 9,372,508 B2 | 6/2016 | Wang |
| 9,404,644 B1 | 8/2016 | Perez-Bravo et al. |
| 9,416,551 B2 | 8/2016 | Hall |
| 9,435,518 B2 | 9/2016 | Cope et al. |
| 9,445,044 B1 | 9/2016 | Cope et al. |
| 9,459,656 B2 | 10/2016 | Shai |
| 9,564,049 B2 | 2/2017 | Diba |
| 2006/0098153 A1 | 5/2006 | Slikkerveer et al. |
| 2006/0204675 A1 | 9/2006 | Gao et al. |
| 2007/0000849 A1 | 1/2007 | Lutz |
| 2007/0241002 A1 | 10/2007 | Wu et al. |
| 2008/0042940 A1 | 2/2008 | Hasegawa |
| 2008/0218369 A1 | 9/2008 | Krans et al. |
| 2009/0189917 A1 | 7/2009 | Benko et al. |
| 2011/0134144 A1 | 6/2011 | Moriwaki |
| 2012/0002360 A1 | 1/2012 | Seo et al. |
| 2012/0092363 A1 | 4/2012 | Kim et al. |
| 2012/0218753 A1 | 8/2012 | Joffer |
| 2012/0236509 A1* | 9/2012 | Cope ................ G02F 1/133305 361/730 |
| 2012/0313862 A1 | 12/2012 | Ko et al. |
| 2013/0100392 A1 | 4/2013 | Fukushima |
| 2016/0014882 A1 | 1/2016 | Jongman |

* cited by examiner

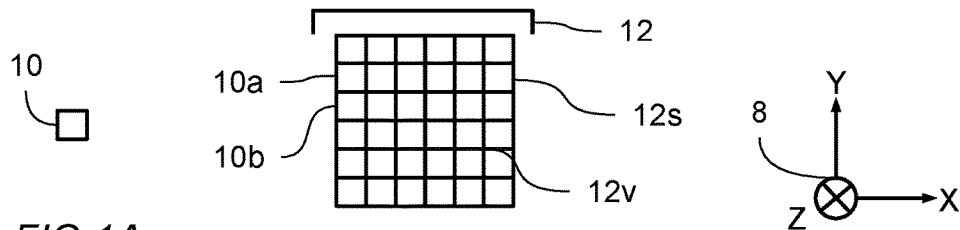
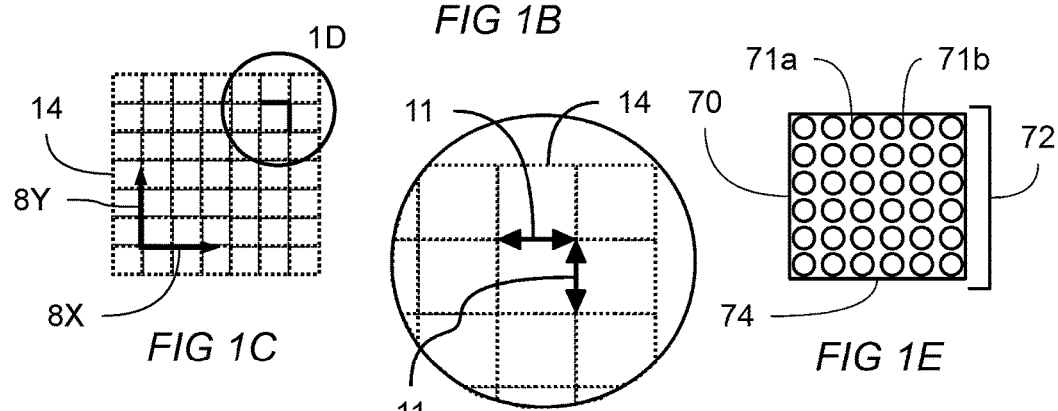
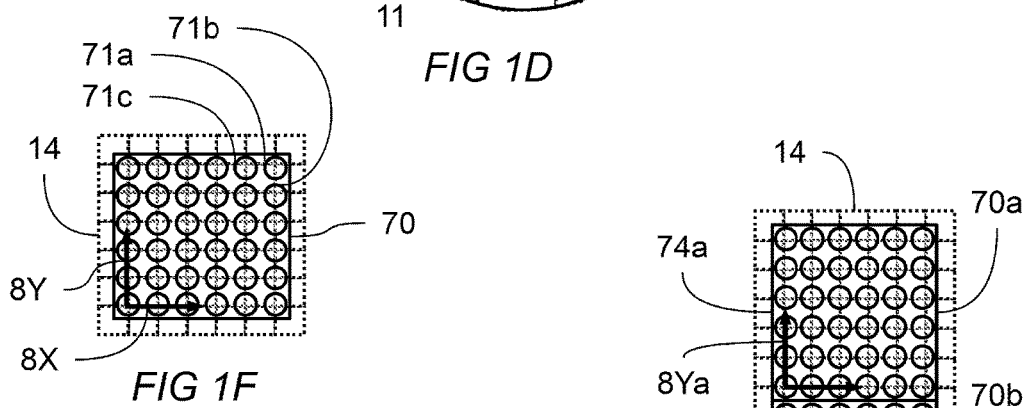
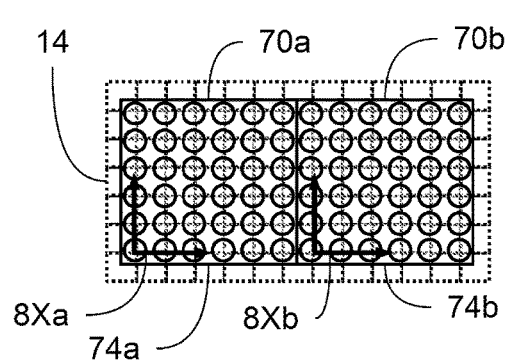

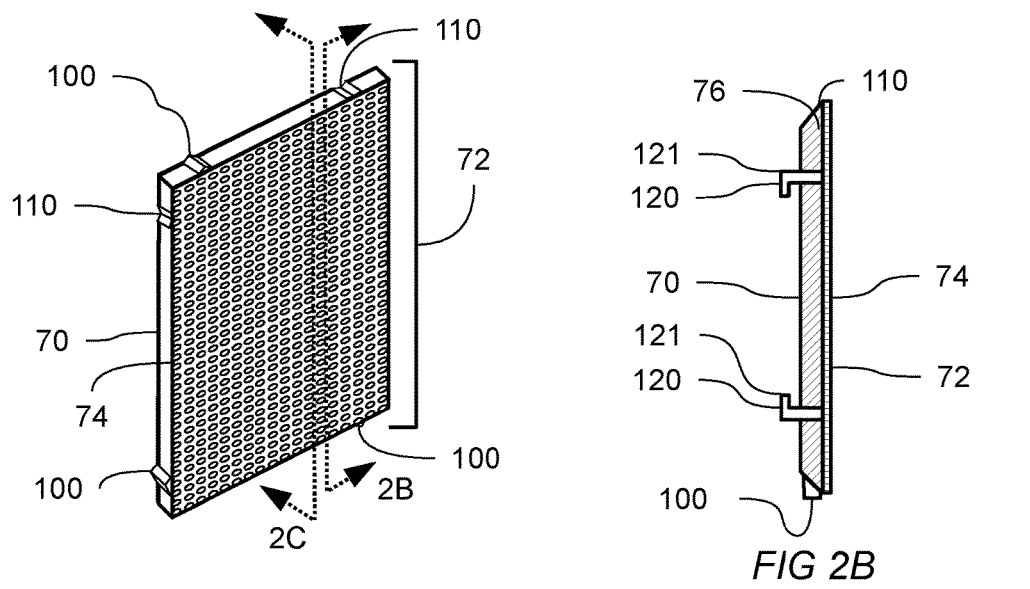
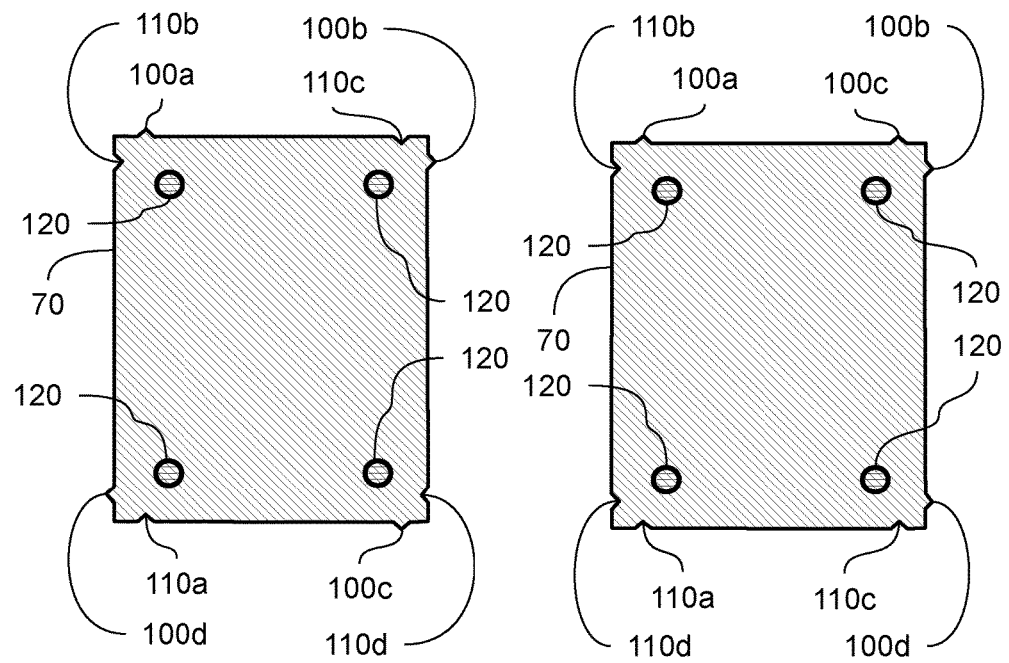

MODULAR FLEXIBLE DISPLAY SYSTEM AND METHODS

CROSS REFERENCE TO RELATED APPLICATIONS

This non-provisional utility application is a continuation of and claims the benefit of application Ser. No. 15/822,895, filed Nov. 27, 2017 and entitled "Modular Flexible Display System and Methods". application Ser. No. 15/822,895 claimed the benefit of prior filed U.S. application Ser. No. 15/332,516, filed on Oct. 24, 2016 and entitled "Modular Flexible Display System and Methods". application Ser. No. 15/332,516 claimed the benefit of U.S. provisional Application No. 62/246,587, filed on Oct. 26, 2015, entitled "Modular Flexible Display System and Methods". application Ser. Nos. 15/822,895, 15/332,516, and 62/246,587 are incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND

The sense of sight is utterly compelling to those human beings who possess it. The adage that a picture is worth a thousand words resonates with an appreciation of the profound importance of taking in visual information. The sense of sight is unique in allowing us to absorb so much information from our world so quickly. It is natural then that advertisers, entertainers, artists, and others all want to engage people with their own visual content for the purpose creating a desired response in their intended audience. A large scale visual display system is a particularly compelling way for people to experience the presentation of visual information and such systems are the focus of the present disclosure.

There are numerous features of a visual display system that contribute to its impact upon viewers including: size, brightness, contrast, color saturation, color depth, display refresh rate, resolution, pixel pitch, pixel pitch uniformity, and others.

There are numerous other features of a visual display system that are of interest to the owners and operators of such systems including: ease of installation, ease of service, reliability, ease of configuration, ease of maintenance, ease of operation, cost of the system, cost of installation, cost of operation, cost of service, and others.

Display systems with large screen sizes present a number of difficult problems that are in need of solution. A typical mounting environment for a large display is on the outside structure of an existing building. Buildings are often situated so that the walls of the building are close to one or more real estate property boundaries. Installing a display system onto the outside of a building that is already constructed runs the risk of straying into the air rights of an adjacent real estate parcel because of the added thickness of the display system. If the display system is too thick the owner of the system may be forced to either remove the system or obtain the air rights in the adjacent real estate lot at added expense.

Another difficult problem in need of solution relates to the mounting of a large display on the outside of a building. The outer envelop of many buildings is constructed of brick, stone, concrete, and other materials that may be strong in compression, but weak in tension. The tension component of the structural load created by mounting a display system to the outside of a building is increased by both the thickness and the weight of the display system, especially when the system is mounted in a cantilevered configuration.

Yet another difficult problem in need of solution is that the outer envelop of most buildings is neither designed nor constructed to provide a smooth, even mounting surface, having no discontinuities. What is needed is a mounting system that is able to smooth out the unevenness of the underlying building structure so that the viewing plane of the large display shows no discontinuities and no unevenness.

In consideration of the foregoing points, it is clear that embodiments of the present disclosure confer numerous advantages and are therefore highly desirable.

SUMMARY

The present disclosure is directed to modular display systems, display modules, systems for mounting and servicing modular display systems, and methods for making, using, and servicing the modules and systems described.

Display systems of the present disclosure comprise a plurality of display modules assembled onto a support frame to make a large, unified, visual display. Each display module in the system comprises a plurality of light emitting elements coupled to a flexible substrate and arranged in a predetermined pattern with respect to a display plane. Each display module is shaped so that it may abut one or more other display modules without introducing gaps or overlaps between adjacent display modules. The display systems disclosed create a highly uniform visual effect by creating highly uniform spacing between light emitting elements, both within a single display module and across a plurality of display modules when the plurality are assembled into a large, unified, visual display. The present disclosure provides complementary alignment features that cooperatively enforce alignment between adjacent display modules thereby maintaining highly uniform spacing of light emitting elements throughout the plurality of assembled display modules.

Additional features of the present disclosure address the needs of mounting, assembling, and servicing of large visual displays that are created from one or more display modules. One typical installation environment for a large display system is a rigid architectural structure like a wall or a curved wall that provides a mounting surface. Another typical installation environment may suspend a large display from a top mounted structure so that the display may appear to float. Other typical installation environments adapt the curvature of the viewing plane to convex, concave, and multiple curvature containing shapes that each have their own appeal and challenges. A system of modular support frames according to the present disclosure may be assembled thereby providing a substructure for attaching display modules to present a substantially flat viewing plane. In other embodiments of the current disclosure, a system of modular support frames may be assembled thereby providing a substructure for attaching display modules to present a non-flat viewing plane having convex, concave, or multiple convex and concave curvatures. One or more display modules may be individually mounted and unmounted from the system of support frames without substantially disturbing adjacent display modules.

Each display module provides a plurality of light emitting elements arranged on a display plane. After assembly, the plurality of display modules collectively create a viewing plane that may be viewed by the viewing public. In such an installation, the vast majority of the display system is located in the space between the viewing plane and the mounting surface. Installations of this configuration may be difficult, or impossible, to service or install from behind the viewing plane because the wall or curved wall that provides the mounting surface are rigid, contiguous structures that do not permit such access. The present disclosure provides support frame systems and display modules having cooperative mounting features allowing display modules to be installed and serviced from the viewing side of the viewing plane. In other installations, access to the front of the display may be difficult, or impossible, because of height hazards. The present disclosure provides frame systems and display modules having cooperative mounting features allowing display modules to be installed and serviced from the back side of the viewing plane.

To make the description more precise, it is useful to consider a three dimensional Cartesian coordinate system consisting of mutually orthogonal axes x, y, and z. The x-y plane is identified as being parallel to the viewing plane, and the z axis is in a direction perpendicular to the viewing plane. In this coordinate system it is the z axis that allows a viewer of the display to be in front of the viewing plane while the mounting surface and support frame are behind the viewing plane. The support frame system provides a means of securely and removeably coupling a plurality of display modules to a mounting surface while allowing the complementary alignment features of adjacent display modules to cooperatively create a uniform alignment of the plurality of light emitting elements on each of the plurality of display modules.

Features of the disclosure allow display modules to be installed, serviced, and removed from the front of the viewing plane. Features of the disclosure allow display modules to be installed, serviced, and removed from behind the viewing plane. A display module may allow engagement onto a portion of the support frame while the orientation of the display module is tilted with respect to the viewing plane. The progressive engagement of frame couplers with the support frame permits the display module to rotate about as the display plane of the display module is tilted both toward and away from the viewing plane. By rotating and/or translating the display module one or more complementary pairs of alignment features on adjacent display modules can be operatively engaged. When complementary alignment features on adjacent display modules are operatively engaged, the display planes of adjacent display modules are aligned and may be made substantially co-planar. In some embodiments a frame retention means may be operated from the front of the display into a retaining position, thus securing the display module to the support frame while urging the one or more pairs of complementary alignment features to maintain a predetermined and uniform pitch distance between adjacent display modules. In other embodiments a frame retention means may be operated from the back of the the display into a retaining position. The plurality of display modules installed onto the support frame collectively create a viewing plane having a highly uniform visual effect by maintaining a pitch distance between adjacent display modules that is substantially equal to the pitch distance within an individual display module.

Addition features of the disclosure provide for flexible display module features and constructions enabling the construction of large systems of flexible display modules having desirable viewing properties, desirable flexibility, and desirable weather and environmental resistance properties.

BRIEF DESCRIPTION OF THE DRAWINGS

These and other features, aspects, and advantages of the present invention will become better understood with regard to the following description, appended claims, and accompanying drawings where:

FIG. 1A shows a square consistent with a regular four sided polygon.

FIG. 1B shows a square tiling of a two dimensional plane

FIG. 1C shows coordinate axis defined on square tiling. Enlarged view 1D is indicated FIG. 1D shows an enlarged view of the indicated region of FIG. 1C showing uniform row and column pitch distance.

FIG. 1E shows a plan view of a display module having a plurality of light emitting elements coordinate axis defined on square tiling.

FIG. 1F shows the display module of FIG. 1E overlaid with the predetermined pattern of square tiling and coordinate axes.

FIG. 1G shows a plan view of two display modules aligned along their y-axis.

FIG. 1H shows a plan view of two display modules aligned along their x-axis.

FIG. 2A shows a perspective view of a display module. Cross sections 2B and 2C are indicated.

FIG. 2B shows a cross sectional schematic view of the display module of FIG. 2A.

FIG. 2C shows another cross sectional schematic view of the display module of FIG. 2A.

FIG. 2D shows a cross sectional schematic view of another embodiment of a display module having a different configuration of alignment and complementary alignment features.

LIST OF REFERENCE NUMBERS APPEARING IN THE FIGURES

Figure 2E:
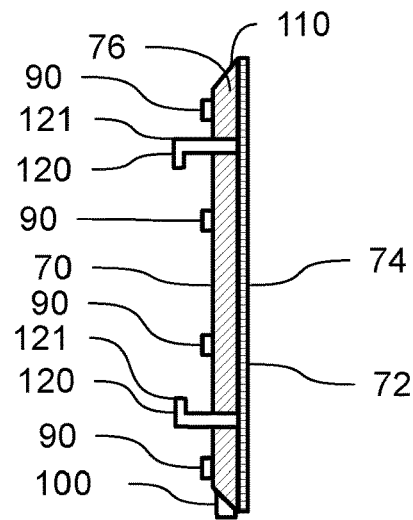
FIG. 2E shows a cross sectional schematic view, in the same direction as FIG. 2B, of another embodiment of a display module having magnetic couplers.

8—coordinate system showing x-axis, y-axis, and z-axis
8X—x-axis
8Y—y-axis
8Z—z-axis
10—square tile, which is a regular 4 sided polygon
10a, 10b, etc.—first square, second square, etc.
11—pitch distance
12—square tiling of the plane
12v—representative vertex of the square tiling
12s—representative side of the square tiling
14—predetermined pattern corresponding to a tiling of the plane
30—tension member
32—compression member
40—support frame
41—support direction
42—support frame aperture
42a, 42b, etc.—first, second, etc. support frame aperture
44—thin planar support body
46—display mounting face
70—flexible display module
70a, 70b, 70c etc.—first, second, third, etc. flexible display module
71—light emitting element
71a, 71b, etc.—first, second, etc. light emitting element
72—plurality of light emitting elements
74—display plane
75—display plane disposed at a first angle with respect to the viewing plane
76—flexible substrate
80—viewing plane
82—environmental barrier coating
84—semi rigid front mask
90—magnetic coupler
92—coupler alignment frame
100—alignment feature
100a, 100b, 100c, etc.—first, second, third, etc. alignment feature
110—complementary alignment feature
110a, 110b, 110c, etc.—first, second, third, etc. complementary alignment feature
120—frame retention means
121—frame retention means in a non-retaining position
123—frame retention means in a retaining position Description Tesselation of a planar surface is the tiling of the plane using one or more geometric shapes, called tiles, creating no gaps and no overlaps. A periodic tiling has a repeated geometric pattern. A regular tiling is a tiling in which all tiles are regular polygons having the same size and shape. Square, triangular, and hexagonal tilings are each an example of a regular, periodic tiling that can achieve a tesselation of a planar surface without gaps or overlaps. Tilings are of special interest in the construction of modular displays because their properties enable the construction of large displays with desirable properties. Assembling a plurality of smaller display modules in which each display module is configured to have a size, shape, and orientation corresponding to a predetermined tiling may produce a large display having no gaps and no overlaps between adjacent display modules.

Within a single display module, a plurality of light emitting elements may be arranged in a predetermined pattern derived from an appropriately configured tiling. A planar tiling of regular polygons consists of edges and vertexes. The set of vertexes of a regular polygon tiling can be seen to create a pattern with a high degree of regularity. A highly uniform visual effect may be produced by placing a light emitting element at or about each of the vertexes of a regular polygon tiling.

In creating a uniform visual effect, it is useful to consider a property called pitch distance, which is the distance between any light emitting element and its closest adjacent light emitting elements. It can be seen that a highly uniform visual effect is produced by maintaining a highly uniform pitch throughout a single display module and across a plurality of adjacent display modules. Preferred embodiments of the present disclosure use light emitting elements located at or about the vertexes of a regular polygon tiling. A regular square tiling is one such preferred tiling, producing a uniform visual effect by providing uniform spacing between both rows and columns of light emitting elements. The spacing between adjacent rows and between adjacent columns of a regular square tiling may be referred to as the pitch of that pattern. In such a square tiling, it can be seen that any light emitting element will have at least two closest adjacent neighboring elements that are spaced apart from each other by a distance close to or substantially equal to the pitch distance.

In addition to uniform pitch within a single display module, the spacing between display modules can be controlled so that uniform pitch of light emitting elements is maintained across a plurality of assembled display modules. A preferred embodiment is to provide a display module with a perimeter region, of a predetermined width, that contains no light emitting elements. The preferred width of the perimeter region is less than or about equal to one half of the pitch distance, when measured inward and along the edges of the regular polygon tiling defining the location of the plurality of the light emitting elements. When two display modules are assembled adjacent to one another, each module may provide a perimeter region width of about one half of the pitch, which cumulatively creates a pattern of uniform pitch spanning both modules. A plurality of display modules may thereby be assembled to create uniform pitch spanning the plurality of display modules.

A single display module may comprise a plurality of light emitting elements coupled to a flexible substrate, and arranged in a predetermined pattern corresponding to the vertexes of a regular polygon tiling. The display module has a perimeter. A plurality of display modules may be assembled such that a portion of the perimeter of each display module abuts a portion of the the perimeter of at least one other display module, each module positioned to maintain uniform pitch spacing across the plurality of display modules.

A display system according to the present disclosure may be constructed by assembling a plurality of display modules onto a support frame, the support frame having been previously erected.

Turning now to FIG. 1A, shown is a regular four sided polygon, also called a square 10, consistent with the square tiling 12 of the two dimensional plane shown in FIG. 1B. A coordinate system 8 is indicated so as to make discussion of geometry features of the present disclosure more clear. Coordinate system 8 applies to all figures FIG. 1A-FIG. 1H. Square tiling 12 is comprised of a plurality of square tiles, of which first square 10a and second square 10b are typical, arranged so that no gaps and no overlaps are produced. When arranged into the predetermined pattern shown in FIG. 1B, the square tiling 12 can be seen to create a plurality of vertex 12v and a plurality of side 12s, in which every vertex 12v is separated a distance of about 12s from each of its closest neighboring vertexes.

FIG. 1C shows predetermined pattern corresponding to a tiling of the plane 14 according to a square tiling. Overlaid onto the predetermined pattern corresponding to a tiling of the plane 14 are x-axis 8X and y-axis 8Y, showing that a coordinate system can be overlaid onto the the predetermined pattern to facilitate clear disclosure of the location and alignment of other features to be described. The enlarged section, denoted FIG. 1D, shows that the square tiliing of the plane gives rise to a highly uniform spacing of vertexes, which can be characterized as pitch distance 11. Pitch distance 11 corresponding to the predetermined pattern 14 gives rise to uniform spacing between rows and columns when that predetermined pattern is based upon a square tiling. It can be seen that row spacing and column spacing are both about equal to the pitch distance 11.

Turning now to FIG. 1E, shown is a flexible display module 70 having a plurality of light emitting elements 72, of which first light emitting element 71a and second light emitting element 71b are individual members of the plurality. Plurality of light emitting elements 72 is shown arranged according to a predetermined pattern so as to create a highly uniform visual effect upon display plane 74. FIG. 1F shows how predetermined pattern 14 according to a square tiling of the plane may be used to position individual light emitting elements 71a, 71b, and 71c according to the location of the vertexes of said predetermined pattern 14. Superimposed upon the plurality of light emitting elements are x-axis 8X and y-axis 8Y. The flexible display module 70 of FIG. 1F comprises a plurality of light emitting elements, each of which may be a single light emitting device or multiple light emitting devices. A preferred light emitting element combines red, blue, and green light emitting devices within one light emitting element so as to provide full color spectrum display. Monochrome and other combinations of devices may be used still within the spirit and scope of this disclosure. The display modules of FIG. 1E and FIG. 1F each have a region adjacent to their perimeter that is free from light emitting elements. This enables close spacing of adjacent modules as will be seen now.

FIG. 1G shows a first flexible display module 70a adjacent to a second flexible display module 70b and disposed so that their display planes 74a and 74b abut and their respective y-axes 8Ya and 8Yb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module.

FIG. 1H shows a first flexible display module 70a adjacent to a second flexible display module 70b and disposed so that their respective display planes 74a and 74b abut and their respective x-axes 8Xa and 8Xb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module. When abutted and aligned in the foregoing manner, two adjacent modules may be combined such that their combined plurality of light emitting elements are disposed upon a single predetermined pattern 14 defining a regular tiling of the plane.

FIG. 1G and FIG. 1H make it clear that a large display may be constructed from display modules designed according to the teaching of FIG. 1A-FIG. 1H. Such a large display will tile the two dimensional plane without gaps and without overlaps and produce a highly uniform visual effect. Any number of display modules may be combined in both x and y directions to make a large display that is substantially free from visual aberrations. Substantially free in the foregoing description means that there are no noticeable visual aberrations when viewed by an average person spaced apart from the display by a typical viewing distance.

FIG. 2A shows a perspective view of a flexible display module 70 having a plurality of light emitting elements 72 coupled to a flexible substrate 76 and disposed in a predetermined pattern to create a display plane 74. Also coupled to flexible substrate 76 are alignment feature 100 and complementary alignment feature 110, which are both designed to operatively engage features on adjacent display modules so as to cooperatively establish and maintain alignment and registration with adjacent display modules, thereby creating a highly uniform visual effect. Highly uniform visual effect in the foregoing description means that there are no noticeable visual aberrations when viewed by an average person spaced apart from the display by a typical viewing distance. Alignment feature 100 is designed so that it may operatively engage a complementary alignment feature on an adjacent display module and thereby constrain the relative position of the two adjacent display modules. Likewise, complementary alignment feature 110 is designed so that it may operatively engage an alignment feature on an adjacent display module and thereby constrain the relative position of the two adjacent display modules. In preferred embodiments, a flexible display module may have a plurality of alignment and complementary alignment features. An x-axis may be defined to lie in the display plane. A y-axis, non-parallel to said x-axis, may also be defined to lie in the display plane. Engagement of an alignment feature with a complementary alignment feature on an adjacent module may create: substantial alignment of the x-axes of the display planes of the adjacent modules, substantial alignment of the y-axes of the display planes of the adjacent modules, substantial alignment of both x-axes and y-axes of the two modules, substantial co-planarity of the display planes of the adjacent modules, substantial alignment of either x-axes or y-axes along with the substantial co-planarity of the display planes of the adjacent modules. Substantial alignment in the foregoing description means alignment sufficient to avoid perceivable visual aberration between adjacent display modules. Substantial co-planarity in the foregoing description means a degree of co-planarity that is sufficient to avoid perceivable visual aberration between adjacent display modules.

Shown now in FIG. 2B is a cross sectional view as indicated from FIG. 2A. The cross sectional view shows additional features of flexible display module 70 not visible in FIG. 2A due to its orientation. Flexible display module 70 additionally comprises: a frame retention means 120 coupled to flexible substrate 76 and adapted to engage with a support frame. The support frame is not shown in this figure. Frame retention means 120 is shown in the figure in a non-retaining position 121. Frame retention means is operative to move between said non-retaining position 121 and a retaining position for securing the display module to a support frame, further characterized in that frame retention means 120 may be actuated by a person from the display plane side of the display module, or by a person on the side of the flexible display module obverse to the display plane. In preferred embodiments the frame retention means may be actuated by means of a turning motion, and thereby progressively engage a clamping force between the support frame and flexible display module 70. The clamping force may be provided by a spring member that securely, but not rigidly, attaches the display module to the support frame. Also shown in FIG. 2B are alignment feature 100 and complementary alignment feature 110 which are operative for engaging, respectively, a complementary alignment feature and an alignment feature of adjacent display modules. In preferred embodiments adjacent display modules may be identical to flexible display module 70. It is noted that elements appearing in the drawings may not be drawn to scale and that this is done in the interest of clarity of the disclosure.

Shown in FIG. 2C is a cross sectional view as indicated from FIG. 2A. In this figure the complementary mechanical design of alignment feature 100 and complementary alignment feature 110 can be seen. A plurality of alignment and complementary alignment features are shown. Also shown is a circular cross section of frame retention means 120, which facilitates actuation of frame retention means 120 by means of rotation. Multiple pairs of alignment-complementary alignment features are shown in FIG. 2C. When a plurality of identical flexible display modules are tiled into a display system: first alignment feature 100a may operatively engage a first complementary alignment features 110a of an adjacent flexible display module; second alignment feature 100b may operatively engage a second complementary alignment features 110b of an adjacent flexible display module; third alignment feature 100c may operatively engage a third complementary alignment features 110c of an adjacent flexible display module; and, fourth alignment feature 100d may operatively engage a fourth complementary alignment feature 110d of an adjacent flexible display module. Operative engagement of alignment features with complementary alignment creates substantial alignment and substantial co-planarity among and between a plurality of adjacent flexible display modules. Substantial alignment in the foregoing description means alignment sufficient to avoid perceivable visual aberration between adjacent display modules. Substantial co-planarity in the foregoing description means a degree of co-planarity that is sufficient to avoid perceivable visual aberration between adjacent display modules.

FIG. 2D shows a cross sectional view similar to FIG. 2C, but of another embodiment of a flexible display module 70 comprising a different configuration of alignment and complementary alignment features. The embodiment of FIG. 2D shows a rectangular flexible display module 70 in which the combination of alignment features and complementary alignment features is different for each side of the display module. According to the embodiment of FIG. 2D, tiling a display system with adjacent flexible display modules requires that the adjacent modules must be fit together in a specific way. Thus the system of flexible display modules may be fit together in a way that enforces a specific orientation of each flexible display module so that, with respect to adjacent display modules: first alignment feature 100a may operatively engage a first complementary alignment feature 110a of an adjacent flexible display module; second alignment feature 100b may operatively engage a second complementary alignment features 110b of an adjacent flexible display module; third alignment feature 100c may operatively engage a third complementary alignment features 110c of an adjacent flexible display module; and, fourth alignment feature 100d may operatively engage a fourth complementary alignment feature 110d of an adjacent flexible display module.

FIG. 2E is a cross sectional view of another embodiment of flexible display module 70, shown from a viewpoint similar to FIG. 2B. Flexible display module 70 comprises a plurality of light emitting elements 72 coupled to a flexible substrate 76 and disposed in a predetermined pattern to create a display plane 74. Flexible display module 70 additionally comprises: one or more magnetic couplers 90 coupled to flexible substrate 76 and adapted to engage with a ferromagnetic support frame. The support frame is not shown in this figure. Frame retention means 120 is shown in the figure in a non-retaining position 121. Frame retention means 120 is operative to move between said non-retaining position 121 and a retaining position for securing the display module to a support frame, further characterized in that frame retention means 120 may be actuated by a person from the display plane side of the display module, or by a person on the side of the flexible display module obverse to the display plane. In preferred embodiments the frame retention means may be actuated by means of a turning motion, and thereby progressively engage a clamping force between the support frame and flexible display module 70. The clamping force may be provided by a spring member that securely, but not rigidly, attaches the display module to the support frame. Also shown in FIG. 2E are alignment feature 100 and complementary alignment feature 110 which are operative for engaging, respectively, a complementary alignment feature and an alignment feature of adjacent display modules. In preferred embodiments adjacent display modules may be identical to flexible display module 70.

Figure 2F:
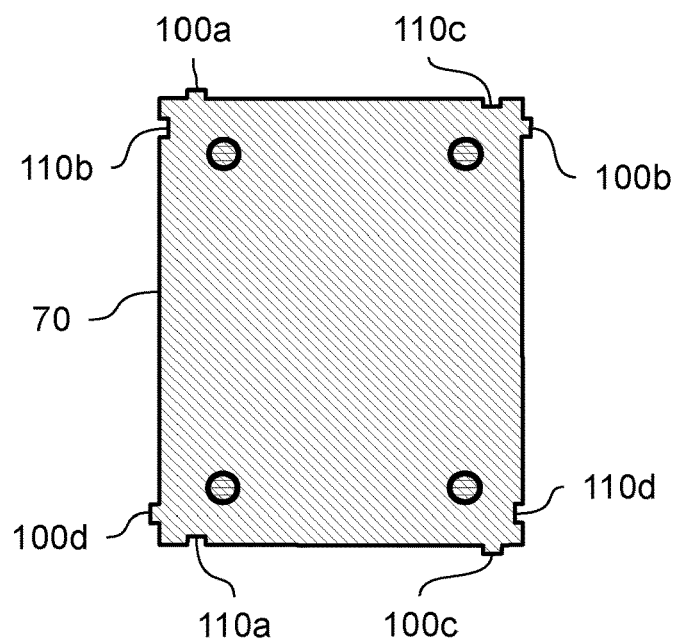
FIG. 2F shows a cross sectional schematic view, in the same direction as FIG. 2C, of another embodiment of a display module having a different configuration of alignment and complementary alignment features.

It is clear that a variety of complementary physical shapes can be used to achieve the alignment and complementary alignment functionality required. FIG. 2F is a cross sectional view of another embodiment of flexible display module 70, shown from a viewpoint similar to FIG. 2C. The embodiment in the figure shows: a first alignment feature 100a operative to engage a first complementary alignment feature 110a on an adjacent flexible display module of identical design; a second alignment feature 100b operative to engage a second complementary alignment feature 110b on an adjacent flexible display module of identical design; a third alignment feature 100c operative to engage a third complementary alignment feature 110c on an adjacent flexible display module of identical design; and, a fourth alignment feature 100d operative to engage a fourth complementary alignment feature 110d on an adjacent flexible display module of identical design.

Figure 3A:
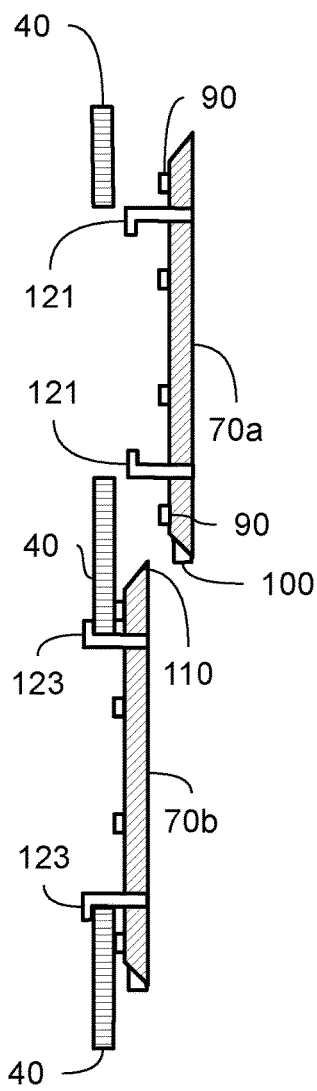
FIG. 3A-FIG. 3C show a cross sectional schematic view of an embodiment according to the present disclosure in which a display module may be become operatively engaged with the alignment features of more than one adjacent display module as the display module is installed on a support frame. Installation and removal of display modules from support frame may be accomplished from the front side or the back side of the display.
Figure 3B:
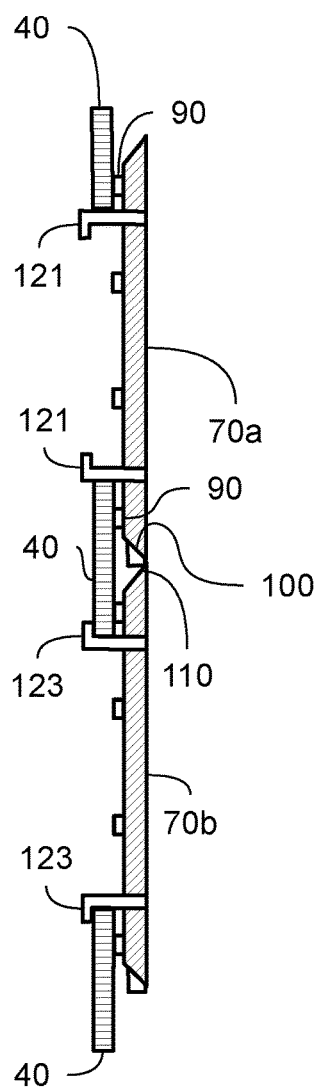
Figure 3C:
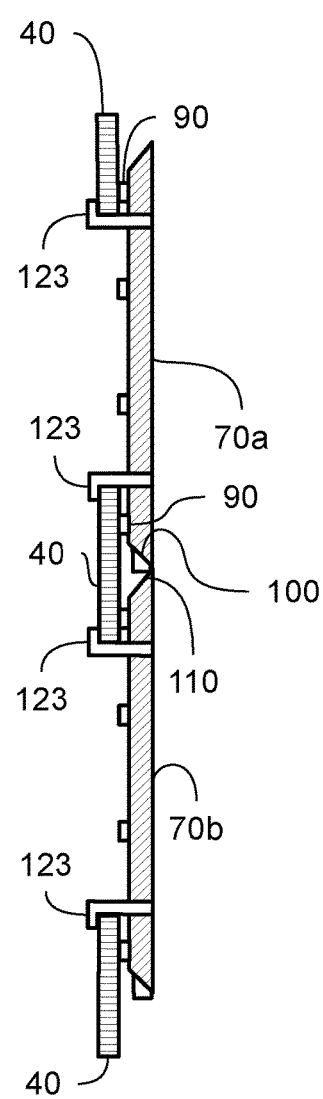

Turning now to FIG. 3A, FIG. 3B, and FIG. 3C, shown are cross sectional schematic views pointing out various beneficial aspects of flexible display module 70, and in particular, how a first flexible display module 70a may be engaged with a support frame 40 and how it may engage with an adjacent second flexible display module 70b, wherein both actions may be completed by a person from the display side of the display module or from the back, or obverse, side of the display module. FIG. 3A shows first flexible display module 70a comprising: alignment feature 100 and complementary alignment feature 110, a plurality of magnetic couplers 90 coupled to the display module and disposed to engage at least a portion of the frame that is ferromagnetic, and frame retention means in a non-retaining position 121. Second flexible display module 70b is shown in an installed position with frame retention means in a retaining position 123, and having a display plane 74, and complementary alignment feature 110 positioned to receive said alignment feature 100 of first flexible display module 70a. A display module may be characterized as being installed onto the support frame when its magnetic couplers have engaged a portion of frame 40 and its frame retention means is disposed in a retaining position. A plurality of display modules that have been installed onto a support frame collectively create a viewing plane in which the plurality of display modules produce a uniform tiling of a portion of the viewing plane having no noticeable gaps or overlaps between adjacent display modules. Second flexible display module 70b is shown in an installed position in FIG. 3A, FIG. 3B and FIG. 3C.

Continuing with FIG. 3A, alignment feature 100 of first flexible display module 70a may be caused to partially engage with complementary alignment feature 110 of second flexible display module 70b when flexible display module 70a is disposed at a first angle with respect to adjacent display module that has already been installed onto the support frame. First flexible display module 70a may then be moved so it is disposed according to FIG. 3B, in which one or more magnetic couplers 90 have engaged a portion of frame 40. While first flexible display module 70a transitions to an installed position, alignment feature 100 of first flexible display module 70a may become operatively engaged with complementary alignment feature 110 of second flexible display module 70b. When an alignment feature and a complementary alignment feature are operatively engaged, the position and/or orientation of the display plane of first flexible display module 70a may be constrained to the position and/or alignment of the display plane of second flexible display module 70b. Operative engagement of alignment and complementary alignment features may constrain adjacent display planes of adjacent display modules in a variety of ways with respect to both position and orientation. The x-axis, y-axis, z-axis, and the angle of the display plane with respect to each of x-axis, y-axis, and z-axis, may individually or in combination be constrained by one or more pairs of alignment and complementary alignment features. In preferred embodiments, operative engagement of alignment feature of a display module with complementary alignment feature of adjacent display module operates to create a pixel gap between adjacent light emitting elements between adjacent display modules that is substantially equal to the pixel gap between light emitting elements within a single display module. Substantially equal in the foregoing description means equal enough to avoid perceivable visual aberration between adjacent display modules.

FIG. 3C shows the apparatus of FIG. 3B in which frame retention means of first flexible display module 70a has been actuated into a frame retaining position 123. Preferred embodiments of frame retention means provide a durable and removeable clamping action to engage support frame 40. It can be seen that the steps shown in FIG. 3A, FIG. 3B, and FIG. 3C can be performed in sequence to install a display module, and, that the sequence can be performed in a reversed order to remove a display module. The frame retention means may be operated by a person from the display plane side of the display module or from the back side of the flexible display module, thereby facilitating both installation and removal from either side of the flexible display module. Preferred embodiments of frame retention means provide a spring member creating a compliant clamping force, effective for retaining the display module despite environmental fluctuations of temperature and humidity. While frame retention means is in retaining position 123, alignment feature 100 and complementary alignment feature are urged to stay operatively engaged. The frame retention means on each display module may provide a secure but compliant attachment to the support frame 40, thereby allowing the pairs of complementary alignment features to determine the orientation and position of the plurality of display planes with respect to each other while, at the same time, the plurality of display modules are free enough with respect to support frame 40 to accommodate such environmental factors as curvature of the support frame, non-uniformity of the support frame, and mechanical and dimensional changes to the support frame caused by vibration, aging, and thermal effects.

The frame retention means on each display module may provide a secure but compliant attachment to the support frame 40, thereby allowing the pairs of complementary alignment features to determine the orientation and position of the plurality of display planes with respect to each other while, at the same time, the plurality of display modules are free enough with respect to support frame 40 to accommodate such environmental factors as curvature of the support frame, non-uniformity of the support frame, and mechanical and dimensional changes to the support frame caused by vibration, aging, and thermal effects.

With continuing reference to FIG. 3A-3C, it is noted that some embodiments may use only magnetic couplers to attach flexible display modules to a support frame, other embodiments may use only mechanical frame retention means to attach flexible display modules to a support frame, and yet other embodiments may use both magnetic couplers and mechanical frame retention means to attach flexible display modules to a support frame.

Figure 4:
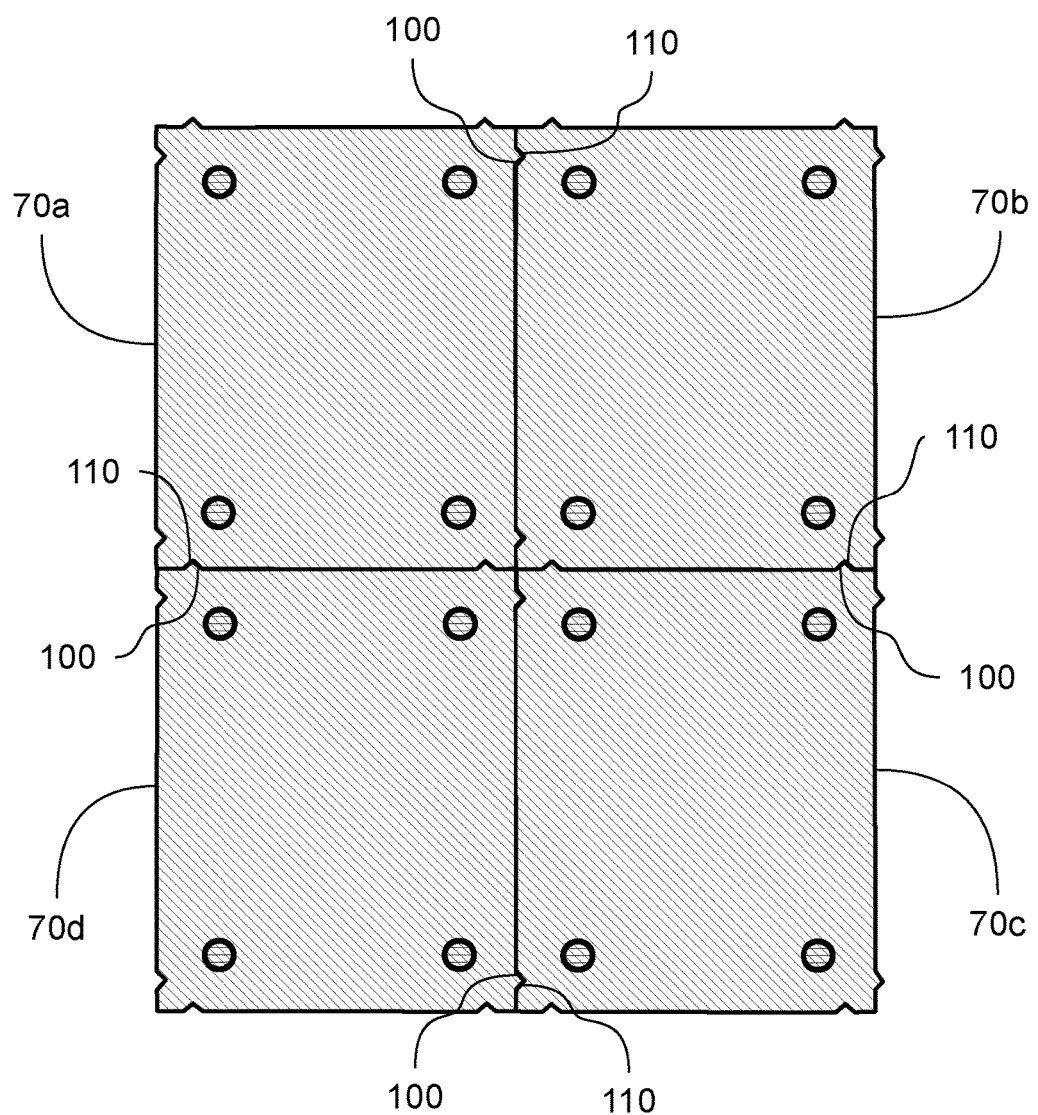
FIG. 4 shows a schematic cross sectional view of a plurality of display modules in which more than one pair of complementary alignment features are simultaneously operatively engaged.

Turning to FIG. 4, shown is a schematic cross sectional view of another embodiment according to the present disclosure in which each of first flexible display module 70a, second flexible display module 70b, third flexible display module 70c, and fourth flexible display module 70d has a plurality of alignment and complementary alignment features. In the modules shown in FIG. 4, each flexible display module has first, second, third, and fourth alignment features as well as first, second, third, and fourth complementary alignment features. According to FIG. 4, when alignment features and a complementary alignment features are operatively engaged between adjacent flexible display modules, the position and/or orientation of the display plane of each flexible display module may be constrained to the position and/or alignment of the display plane of one or more adjacent display modules. Different alignment and complementary alignment features may be simultaneously operatively engaged thereby urging the alignment of the display planes of every adjacent display module.

Figure 5A:
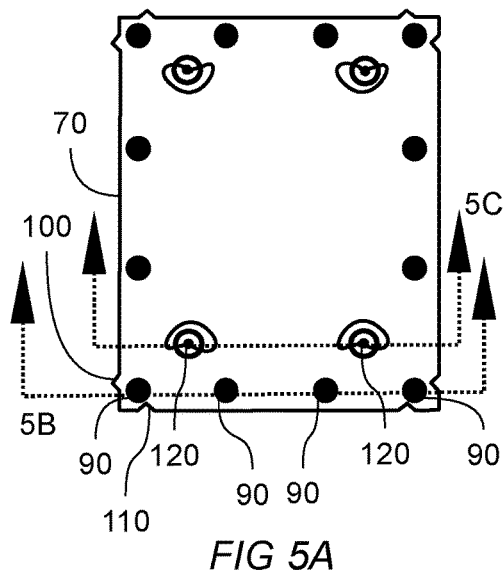
FIG. 5A shows an elevation view of the back of a display module according to an embodiment of the present disclosure. Location and direction of cross section views 5B and 5C are shown.

FIG. 5A shows a view of the back side of a flexible display module 70 according to an embodiment of the disclosure. Visible are one or more alignment features 100, one or more complementary alignment features 110, a plurality of magnetic couplers 90, and a plurality of frame retention means 120. Shown also are dotted lines indicating the location and direction of cross sectional views FIG. 5B and FIG. 5C.

Figure 5B:
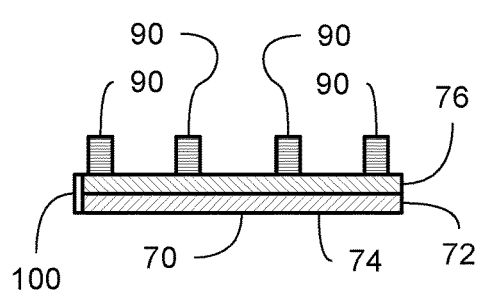
FIG. 5B is a cross sectional view of a display module, consistent with the section indicated in FIG. 5A, showing magnetic coupler and frame retention means for securing a display module to a support frame.

The cross-sectional view according to FIG. 5B shows the plurality of magnetic couplers 90 for a secure attachment to a support frame. Flexible display module 70 may comprise a plurality of light emitting elements 72 coupled to flexible substrate 76 and disposed in a predetermined pattern to create a display plane 74. Visible in FIG. 5B is an alignment feature 100, similar to previously described alignment features.

Figure 5C:
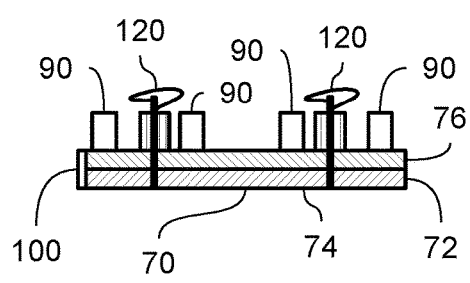
FIG. 5C is a cross sectional view, viewed in the same direction as the view of FIG. 5B, of another embodiment of a flexible display module.

FIG. 5C shows the cross sectional view previously indicated in FIG. 5A. Flexible display module 70 is shown comprising: a plurality of light emitting elements 72 coupled to a flexible substrate 76 and disposed in a predetermined pattern to create a display plane 74; a plurality of magnetic couplers 90 coupled to flexible substrate 76, an alignment feature 100 also coupled to the flexible substrate in a predetermined position. The plurality of magnetic couplers 90 may cooperate with with the plurality of frame retention means to establish a consistent offset distance between a support frame and display plane 74 when flexible display module 70 is installed on a support frame and frame retention means 120 is operated into the retaining position. It is noted that frame retention means may be operated from the display side of the display module or from the back side of the display module.

Figure 6A:
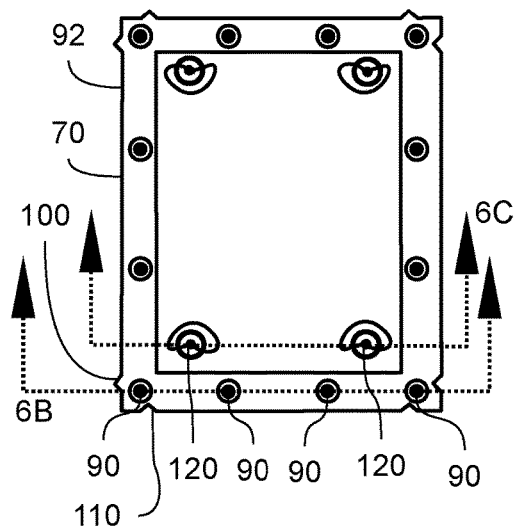
FIG. 6A shows an elevation view of the back of a display module according to an embodiment of the present disclosure. Location and direction of cross section views 6B and 6C are shown.
Figure 6B:
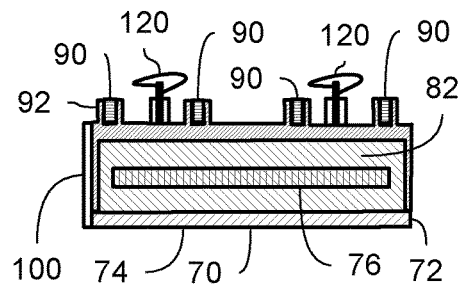
FIG. 6B is a cross sectional view of a display module, consistent with the section indicated in FIG. 6A.
Figure 6C:
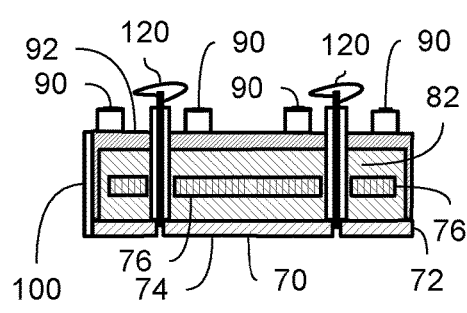
FIG. 6C is a cross sectional view of a display module, consistent with the section indicated in FIG. 6A.

Turning now to FIG. 6A, FIG. 6B, and FIG. 6C, shown is an embodiment of a flexible display module 70 suitable for use in places where protection from the environment is desired. FIG. 6A shows the back side of a flexible display module while FIG. 6B and FIG. 6C are cross sectional views as indicated in FIG. 6A. Flexible display module 70 is shown comprising: flexible substrate 76 surrounded by environmental barrier coating 82, flexible substrate 76 being electrically connected to a plurality of light emitting elements 72 disposed in a predetermined pattern to create display plane 74; one or more alignment features 100 formed at the periphery of the flexible display module; one or more complementary alignment features 110 formed at the periphery of the flexible display; one or more frame retention means 120 operative to releaseably engage a support frame; and a plurality of magnetic couplers 90 coupled in a predetermined position with respect to said display plane 74 by means of coupler alignment frame 92. A portion of coupler alignment frame 92 in close proximity to one or more magnetic couplers may be ferromagnetic and may thereby increase the area of magnetic attraction available to attract the the display module to a ferromagnetic support frame.

In certain preferred embodiments the environmental barrier coating 82 may be a conformal coating operative to substantially seal out liquid and vapor infiltration from said flexible substrate and any electrical or mechanical components coupled in close proximity to said flexible substrate 76. In other preferred embodiments, environmental barrier coating 82 may be a composite of more than one coating layers. A thin layer of one coating type may be employed in intimate contact with said flexible substrate while a more pliable and thicker coating of the same or a different material may applied over top of the first coating. A variety of coating materials may be employed as part of a single layer or multilayered composite environmental barrier coating including, but not limited to: acrylic, epoxy, urethane, and silicone materials. Preferred environmental barrier coatings perform their environmental barrier function while allowing the flexible substrate and display module to flex in both convex and concave configurations. In addition, the coupler alignment frame is configured to allow the display module to flex in both concave and convex configurations.

Figure 7:
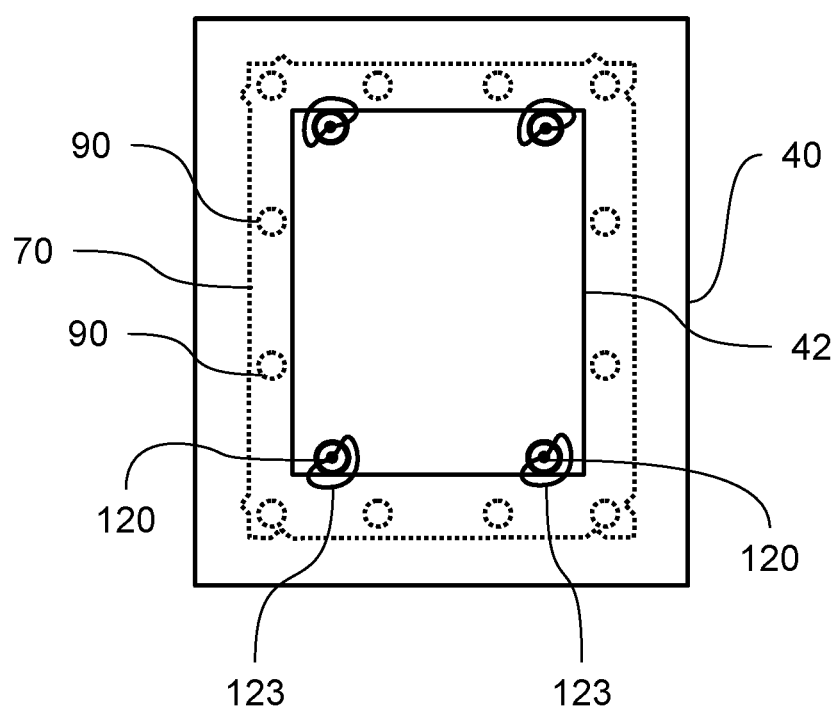
FIG. 7 is an elevation view from the back of a support frame showing a display module installed on the support frame shown with a plurality of frame retention cross means in an installed position.

FIG. 7 is a view from the back side of support frame 40 of a flexible display module 70 installed proximate to a support frame aperture 42. In the figure, a plurality of frame retention means 120 are shown in the retaining position 123. Also in the figure a plurality of magnetic frame couplers are visible in dotted outline coupling flexible display module 70, also shown in dotted outline, to said frame 40. The components shown in dotted outline are shown that way because they are not directly visible from this viewpoint behind support frame 40 when the display module is installed on frame 40.

Figure 8A:
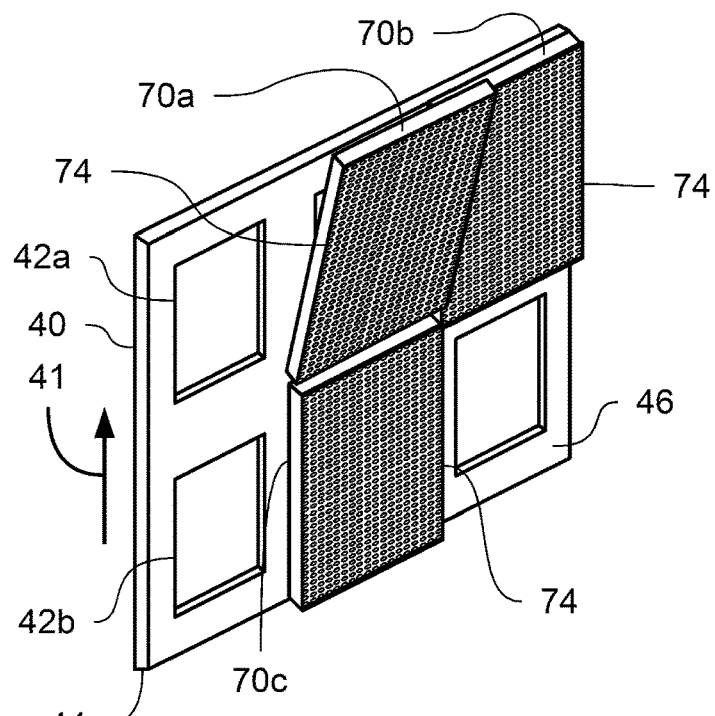
FIG. 8A shows a perspective view of a system of display modules on a support frame. One display module is shown in the midst of being either installed or removed.
Figure 8B:
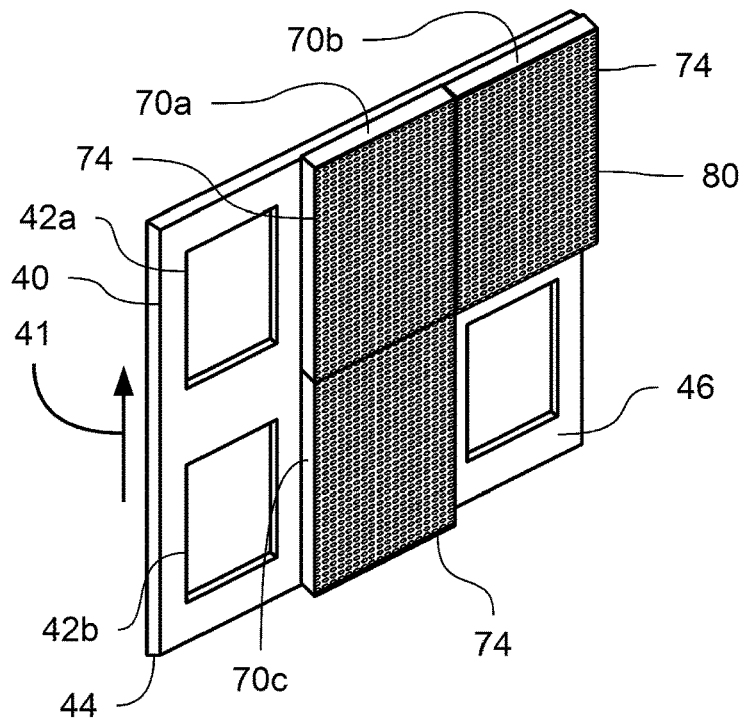
FIG. 8B shows a perspective view of a system of display modules installed on a support frame. Three installed modules are shown collectively creating a viewing plane.

FIG. 8A and FIG. 8B show perspective views of a system of display modules, installed on a support frame 40, consistent with the display modules described previously, however, the drawing is simplified for clarity. First flexible display module 70a of FIG. 8A is shown with display plane 74 tilted at an angle with respect to the collectively established viewing plane of the previously installed display modules, second flexible display module 70b and third display module 70c. When first flexible display module 70a is moved to an installed position, alignment and complementary alignment features are moved to become operatively engaged for establishing and maintaining alignment between the display planes of adjacent modules. FIG. 4 and FIG. 8A and FIG. 8B show, in combination, that multiple pairs of complementary alignment features may be made to operatively engage as the display plane of a display module is moved from being at an angle with respect to the viewing plane to an angle that is coincident with the viewing plane. The display planes of first, second, and third flexible display modules, 70a, 70b, and 70c, respectively, are urged to remain aligned and substantially co-planar by means of the action of multiple alignment features. In some embodiments, pairs of complementary alignment features may be made to operatively engage as the display plane of a display module is moved to abut the display plane of an adjacent display module. In other embodiments, alignment and complementary alignment features on adjacent display modules may be operatively engaged without tilting the display plane of either display module or adjacent display module. Substantially co-planar in the foregoing description means a degree of co-planarity that is sufficient to avoid perceivable visual aberration, when viewed at a typical viewing distance, between adjacent display modules.

FIG. 8A and FIG. 8B show additional features of the present disclosure that address the needs of mounting, assembling, and servicing of large visual displays that are created by tiling one or more display modules onto an underlying modular support frame structure. FIG. 8A shows a perspective view of the front of a support frame 40 according to an embodiment of the present disclosure. Support frame 40 is shown comprising: thin planar support body 44 having one or more support frame apertures 42a and 42b, and having a display mounting face 46 that is suitable for mounting display modules of the present disclosure. Support frame 40 is configured to support the weight of tiled display modules along the direction defined by support direction 41 and is furthermore able to curve in directions transverse to the support direction.

The disclosed support frames and display modules may be used in a number of installation environments. One typical installation environment for a large display system is a rigid architectural structure like a wall that provides a mounting surface onto which the system of support frames may be mounted. Accordingly, in some embodiments of the present disclosure, a system of modular support frames may be assembled thereby providing a substructure for attaching display modules so as to provide a substantially flat viewing plane.

In addition to installation environments that result in a substantially flat viewing plane, other installation environments may require adapting the curvature of the viewing plane to convex, concave, and/or multiple curvature containing shapes that may each have their own appeal and challenges. Accordingly, embodiments of the present disclosure describe a system of modular support frames that may be assembled to provide a substructure for attaching display modules that presents a non-flat viewing plane having convex, concave, or multiple convex and concave curvatures. One or more display modules may be individually installed, serviced, and removed from the system of support frames without substantially disturbing adjacent display modules.

Figure 9A:
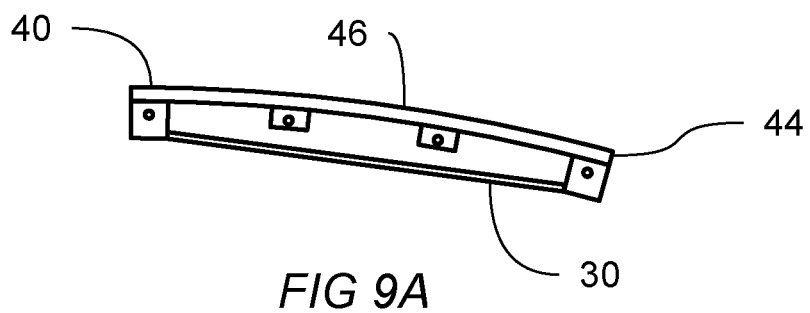
FIG. 9A-FIG. 9B show top down views of various embodiments providing curvature to one or more display mounting faces.
Figure 9B:
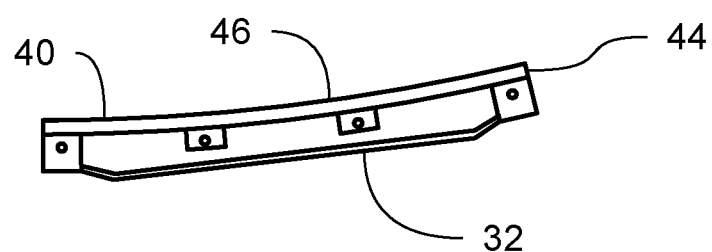

Turning now to FIG. 9A-FIG. 9B, shown are top down views of various embodiments providing curvature to one or more display mounting faces. FIG. 9A shows a top down view of a support frame 40 according to another embodiment of the disclosure in which a tension member 30 coupled to planar support body 44 creates a convex display mounting face 46. When planar support body 44 is not subject to tension member 30, display mounting face 46 may take on a flat configuration. In other embodiments a tension member may not be needed to maintain the curvature of the display mounting face 46.

FIG. 9B shows a top down view of a support frame 40 according to another embodiment of the disclosure in which a compression member 32 coupled to planar support body 44 creates a concave display mounting face 46. When planar support body 44 is not subject to compression member 32, display mounting face 46 may take on a flat configuration. In other embodiments a tension member may not be needed to maintain the curvature of the display mounting face 46.

In addition to environments in which a curved, but fixed shape of viewing plane is desired, other environments may call for adjustable curvatures. Accordingly, other embodiments of the present disclosure provide adjustable tension members and adjustable compression members which may be adjusted to change the curvature of the viewing plane. Furthermore, an adjustable member that operates in compression over a portion of its adjustable range and operates in tension over a different portion of its adjustable range may provide viewing plane curvature ranging from convex to concave.

In order to deploy a large modular display system, a variety of support equipment may be needed beyond the display modules and support frames already described. In particular, a plurality of power supplies and a plurality of display control units may be used to power display modules and to supply image data to the plurality of display modules comprising the viewing plane. It may be convenient to co-locate with a support frame a power supply that can satisfy the power requirements of all of the display modules installed onto that support frame. Likewise, it may be convenient to co-locate with a support frame one or more display control units that can satisfy the data driving requirements of all of the display modules installed onto that support frame. This modular approach can be achieved by means of one or more equipment mounts, each attached to a support rib of a support frame. Attaching equipment mount directly to support rib allows the weight of any mounted equipment to be transmitted into the support structure along the direction of the support rib thereby preventing the attached weight from substantially affecting the ability of support frame to curve smoothly in directions transverse to the support rib. More than one mount may be used to mount the desired amount of equipment.

By means of the previously described systems and methods, a fully modular system can be deployed in which flexible display modules may be tiled onto a support frame system, according to previously described methods, making use of one or more support frame apertures. Operatively engaged alignment and complementary alignment features of adjacent display modules ensure that the plurality of tiled display modules collectively provide a viewing plane without visual aberrations. Flexible environmental barrier coatings may be employed to provide resistance to liquid and vapor infiltration while permitting the display modules to be installed in a variety of environments including concave and convex curved installations.

Although the present invention has been described in considerable detail with reference to certain preferred versions thereof, other versions are possible. It may be desirable to combine features shown in various embodiments into a single embodiment. A different number and configuration of features may be used to construct embodiments of the apparatus and systems that are entirely within the spirit and scope of the present disclosure. Therefor, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

We claim:

1. A modular display system mounted on a support frame, the system comprising:
　a) a plurality of display modules collectively creating a viewing plane on which an image is viewable, each of said plurality of display modules displaying at least a portion of said image, said plurality of display modules comprising a first display module, said first display module comprising:
　　i) a flexible substrate having a flexible environmental barrier coating, the flexible substrate being electrically connected to a plurality of light emitting elements disposed on a display plane in a predetermined pattern, said plurality of light emitting elements collectively displaying said image on said display plane;
　　ii) a releasable frame retention means coupled to said flexible substrate and having a retaining position and a non-retaining position, said retaining position effective for engaging a portion of said support frame, said retaining position effective for urging said display plane to be substantially co-planar with said viewing plane, said non-retaining position allowing said first display module to be removed from said viewing plane, said releasable frame retention means configured to be actuated between said retaining position and said non-retaining position from the display plane side of said display module;
iii) a first alignment feature coupled to said flexible substrate and disposed in a predetermined relationship to said display plane;
iv) a first complementary alignment feature coupled to said flexible substrate and disposed in a predetermined relationship to said first alignment feature;
b) the first display module further characterized in that it has an installed position and an uninstalled position,
i) said installed position characterized in that the releasable frame retention means is in said retaining position and said display plane is substantially co-planar with said viewing plane;
ii) said uninstalled position characterized in that the releasable frame retention means is in said non-retaining position and said display plane is not co-planar with said viewing plane;
c) said plurality of display modules further comprising a second display module identical to said first display module, said second display module in the installed position;
d) said modular display system further characterized in that:
i) when said first display module is in the installed position, the first alignment feature of the first display module operatively engages the first complementary alignment feature of the second display module causing said predetermined pattern of light emitting elements of said first display module to become aligned with the predetermined pattern of light emitting elements of the second display module, the alignment between said first and said second display modules causing no perceivable visual aberration on the viewing plane;
e) said modular display system further characterized in that the plurality of display modules in the installed position collectively create the viewing plane with no visual aberrations between adjacent display modules.

2. The modular display system of claim 1 in which said predetermined pattern of said first display module and said predetermined pattern of said second display module are both further characterized in that each of said plurality of light emitting elements is disposed about a first pitch distance away from at least two closest adjacent light emitting elements, said pitch distance being substantially uniform across said predetermined patterns.

3. The modular display system of claim 1 further characterized in that when the first alignment feature of said first display module operatively engages the first complementary alignment feature of said second display module, a constraint force is created that urges said predetermined pattern of said first display module to align with the predetermined pattern of said second display module.

4. The modular display system of claim 1 further characterized in that the releasable frame retention means is configured to be operated from a side of the display module that is opposite the display plane.

5. The modular display system of claim 1 further characterized in that the releasable frame retention means is configured to be operated from a side of the display module from which said display plane is viewable.

6. The modular display system of claim 1 further characterized in that at least a portion of the viewing plane is configured to follow a convex curve.

7. The modular display system of claim 1 further characterized in that at least a portion of the viewing plane is configured to follow a concave curve.

8. The modular display system of claim 1 further characterized in that at least a portion of the viewing plane is configured to be flat.

9. The modular display system of claim 1 further characterized in that:
a) the first display module and the second display module each further comprise:
i) a plurality of magnetic couplers disposed on a side of the display module that is opposite the display plane;
ii) said plurality of magnetic couplers disposed in a predetermined position with respect to the display plane;
b) each of first display module and second display module attracted to one or more ferromagnetic portions of said support frame by means of magnetic attraction between said magnetic couplers and said one or more ferromagnetic portions.

10. The modular display system of claim 1 further characterized in that:
a) the first display module and second display module each additionally comprise:
i) a second alignment feature coupled to said flexible substrate and disposed in a predetermined relationship to said display plane;
ii) a second complementary alignment feature coupled to said flexible substrate and disposed in a predetermined relationship to said second alignment feature;
b) said plurality of display modules further comprising a third display module identical to said first display module, said third display module in the installed position and its releasable frame retention means in the retaining position;
c) said modular display system further characterized in that:
i) when said first display module is in the installed position, the first alignment feature of the first display module operatively engages the first complementary alignment feature of the second display module causing said predetermined pattern of light emitting elements of said first display module to become aligned with the predetermined pattern of light emitting elements of the second display module, the alignment between said first and said second display modules causing no perceivable visual aberration on the viewing plane;
ii) when said first display module is in the installed position, the second alignment feature of the first display module operatively engages the second complementary alignment feature of said third display module causing said predetermined pattern of light emitting elements of said first display module to become aligned with the predetermined pattern of light emitting elements of the third display module, the alignment between said first and said third display modules causing no perceivable visual aberration on the viewing plane.

11. The modular display system of claim 10 further characterized in that when said first alignment feature of said first display module operatively engages said first complementary alignment feature of said second display module and said second alignment feature of said first display module operatively engages said second complementary alignment feature of said third display module:
- a) said predetermined pattern of said first display module is substantially aligned with the predetermined pattern of said second display module;
- b) said predetermined pattern of said first display module is substantially aligned with the predetermined pattern of said third display module; and,
- c) no perceivable visual aberration is created between said predetermined patterns of said first display module, said second display module and said third display module.

12. The modular display system of claim 11 further characterized in that:
- a) when the first alignment feature of said first display module operatively engages the first complementary alignment feature of said second display module, a constraint force is created that urges said predetermined pattern of said first display module to align with the predetermined pattern of said second display module; and,
- b) when said second alignment feature of said first display module operatively engages said second complementary alignment feature of said third display module, a constraint force is created that urges said predetermined pattern of said first display module to align with the predetermined pattern of said third display module.

13. A method of creating a modular display system on a support frame, the method comprising the steps of:
- a) assembling a plurality of display modules to collectively create a viewing plane on which an image is viewable, the plurality of display modules comprising at least a first display module and a second display module;
- b) displaying at least a portion of said image on each of said plurality of display modules;
- c) each of said plurality of display modules created according to a method comprising the steps of:
  - i) creating a display plane by disposing a plurality of light emitting elements in a predetermined pattern on a flexible substrate;
  - ii) electrically connecting said plurality of light emitting elements to said flexible substrate;
  - iii) coating said flexible substrate with a flexible environmental barrier coating;
  - iv) coupling a releasable frame retention means to said flexible substrate, said releasable frame retention means having a retaining position and a non-retaining position, said retaining position effective for engaging a portion of said support frame, said retaining position effective for urging said display plane to be substantially co-planar with said viewing plane, said non-retaining position allowing said first display module to be removed from said viewing plane, said releasable frame retention means configured to be actuated between said retaining position and said non-retaining position from the display plane side of said display module;
  - v) coupling a first alignment feature to said flexible substrate and disposing said first alignment feature in a predetermined relationship to said display plane;
  - vi) coupling a first complementary alignment feature to said flexible substrate and disposing said first complementary alignment feature in a predetermined relationship to said first alignment feature;
- d) defining for each display module both an installed position and an uninstalled position,
  - i) said installed position characterized in that the releasable frame retention means is in said retaining position and said display plane is substantially co-planar with said viewing plane;
  - ii) said uninstalled position characterized in that the releasable frame retention means is in said non-retaining position and said display plane is not co-planar with said viewing plane;
- e) configuring each of said first display module and said second display module into said installed position;
- f) operatively engaging the first alignment feature of said first display module with the first complementary alignment feature of said second display module and thereby causing said predetermined pattern of light emitting elements of said first display module to become aligned with the predetermined pattern of light emitting elements of said second display module, the alignment between said first and said second display modules causing no perceivable visual aberration on the viewing plane.

14. The method of claim 13 further comprising the steps of:
- a) the method of creating each of said plurality of display modules further comprises the steps of:
  - i) disposing each of said plurality of light emitting elements is about a first pitch distance away from at least two closest adjacent light emitting elements, said pitch distance being substantially uniform across said predetermined patterns.

15. The method of claim 13 further comprising the steps of:
- a) creating a constraint force by operatively engaging the first alignment feature of said first display module with the first complementary alignment feature of said second display module;
- b) urging, by means of said constraint force, said predetermined pattern of said first display module to align with the predetermined pattern of said second display module.

16. The method of claim 13 further comprising the step of:
- a) configuring at least a portion of the viewing plane is to follow a convex curve.

17. The method of claim 13 further comprising the step of:
- a) configuring at least a portion of the viewing plane is to follow a concave curve.

18. The method of claim 13 further comprising the step of:
- a) configuring at least a portion of the viewing plane to be flat.

19. The method of claim 13 further comprising the steps of:
- a) the method of creating said plurality of display modules further comprising the steps of:
  - i) disposing a second alignment feature coupled to said flexible substrate in a predetermined relationship to said display plane;
  - ii) disposing a second complementary alignment feature coupled to said flexible substrate and in a predetermined relationship to said second alignment feature;
- b) assembling a plurality of display modules to collectively create a viewing plane on which an image is viewable, the plurality of display modules additionally comprising a third display module;
- c) configuring said third display module into an installed position;
- d) operatively engaging the second alignment feature of the first display module with a complementary alignment feature of said third display module causing said predetermined pattern of light emitting elements of said first display module to become aligned with a predetermined pattern of light emitting elements of the third display module, the alignment between said first and said third display modules causing no perceivable visual aberration on the viewing plane.

* * * * *